(12) United States Patent       (10) Patent No.:     US 7,401,477 B2
Inoue et al.                    (45) Date of Patent:         Jul. 22, 2008

(54) METHOD FOR BENDING A GLASS SHEET (75) Inventors: Nobuhiro Inoue, Kanagawa (JP); Ken Nomura, Aichi (JP)

(73) Assignee: Asahi Glass Comapny, Limited, Tokyo (JP)

(*) Notice: Subject to any disclaimer, the term of this patent is extended or adjusted under 35 U.S.C. 154(b) by 594 days.

(21) Appl. No.: 10/674,354

(22) Filed: Oct. 1, 2003

(65) Prior Publication Data

US 2004/0079112 A1    Apr. 29, 2004

(30) Foreign Application Priority Data

Oct. 11, 2002 (JP) ............................. 2002-299423

(51) Int. Cl.
  *C03B 11/00*    (2006.01)
  *C03B 23/02*    (2006.01)
(52) U.S. Cl. .................. 65/107; 65/106; 65/29.11; 65/29.19; 65/162; 65/273
(58) Field of Classification Search .................. 65/106, 65/107
  See application file for complete search history.

(56) References Cited

U.S. PATENT DOCUMENTS

| 4,081,263 | A |   | 3/1978  | Mestre et al. |
| 4,361,429 | A | * | 11/1982 | Anderson et al. ............... 65/67 |
| 4,891,055 | A |   | 1/1990  | Shibaoka et al. |
| 5,071,461 | A | * | 12/1991 | Hirotsu et al. ................. 65/104 |
| 5,292,355 | A | * | 3/1994  | Nikander ...................... 65/107 |
| 5,589,248 | A | * | 12/1996 | Tomozane et al. ........... 428/174 |
| 6,014,873 | A |   | 1/2000  | Hirotsu et al. |
| 6,240,746 | B1 |  | 6/2001  | Maeda et al. |
| 6,397,634 | B1 |  | 6/2002  | Takeda et al. |
| 2002/0166344 | A1 | | 11/2002 | Fukai et al. |

FOREIGN PATENT DOCUMENTS

| FR | 709 769      | 5/1931 |
| JP | 61-227932    | 10/1986 |
| JP | 1-122931     | 5/1989 |
| JP | 1-242428     | 9/1989 |
| JP | 2000-351639  | 12/2000 |
| WO | WO98/22402   | 5/1998 |

* cited by examiner

*Primary Examiner*—Steven P. Griffin
*Assistant Examiner*—Jason L. Lazorcik
(74) *Attorney, Agent, or Firm*—Oblon, Spivak, McClelland, Maier & Neustadt, P.C.

(57) ABSTRACT

A glass sheet, which has been heated to have a viscosity of not lower than $10^5$ Pa·s and not higher than $10^8$ Pa·s, is pressed against a mold having a certain bending surface to be bent. There are a step for controlling a bending temperature T and a bending time period t for the glass sheet so as to satisfy the following formulas 1 and 2, and a step for bending the glass sheet:

$$0.05 < \phi < 2.00 \quad \text{Formula 1}$$

$$\phi = \int_0^t \frac{P(\tau)}{\eta(T)} d\tau \quad \text{Formula 2}$$

where $P(\tau)$ is a surface pressure difference (unit: Pa) between a pressure applied on a primary surface of the glass sheet and a pressure applied on a rear surface of the glass sheet at a time $\tau$, t is a bending time period (unit: s), $\eta(T)$ is the viscosity (unit: Pa·s) of the glass sheet at a temperature T, and T is a bending temperature (unit: °C.) at the time $\tau$.

12 Claims, 6 Drawing Sheets

Fig.1(a) Surface pressure difference is constant ($1.0 \times 10^5$ (Pa))

Fig.1(b) Viscosity is constant ($1.0 \times 10^6$ (Pa·s))

METHOD FOR BENDING A GLASS SHEET

The present invention relates to a method for bending glass sheet, in particular a method for bending a glass sheet in a complicated bent shape.

Curved glass sheets have been frequently used for windows in buildings, automobiles and the like. In particular, curved glass sheets make up an extremely large share of the automobile windows. A curved glass sheet is prepared by bending a flat glass sheet. Specifically, a flat glass, which has been prepared by a float method or the like, is cut into a desired shape, is put in a heating furnace, is heated to a lower temperature (about 650° C.) than a softening point and is bent on a ring or a curved roller by gravity or is pressed by being putting on a ring and being pressed against a mold. With regard to how to bend a glass sheet for a display unit, JP-A-1-122931 has disclosed a proposal (see pages 3 to 4 of JP-A-1-122931).

However, the design of automobile windows has been made extremely complicated because of complication in the automobile design for the recent years. The conventional glass production technique has started getting difficult to cope with the complicated design of automobile windows.

Figure 9A:
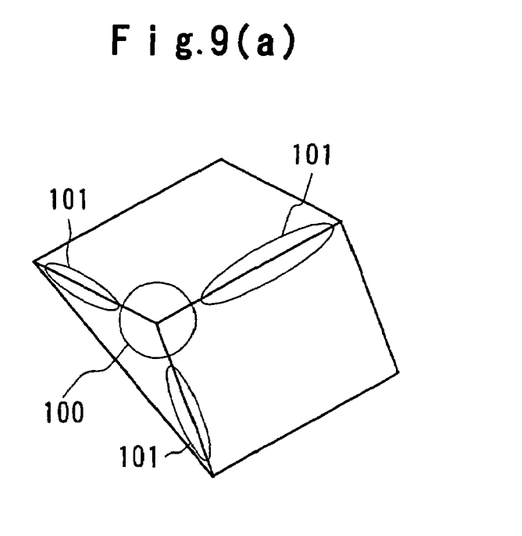
FIGS. 9(a) and 9(b) are perspective views showing examples of a resin window having a complicated shape.

For example, the window design shown in FIG. 9(a) is a so-called "dustpan shape". Windows having such a design have been frequently exhibited as resin windows for concept cars in recent motor shows or the like. A window having such a design comprises totally four surfaces of two triangular surfaces provided laterally and two rectangular surfaces extending from upward to downward and connected with each other through a bent portion 101. This design requires extremely small radii of curvature at bent portions 101 where the two rectangular surfaces are connected with each other or one of the triangular surfaces connects with one of the two rectangular surfaces, and at corners 100 where one of the triangular surfaces connects with the two rectangular surfaces.

Figure 9B:
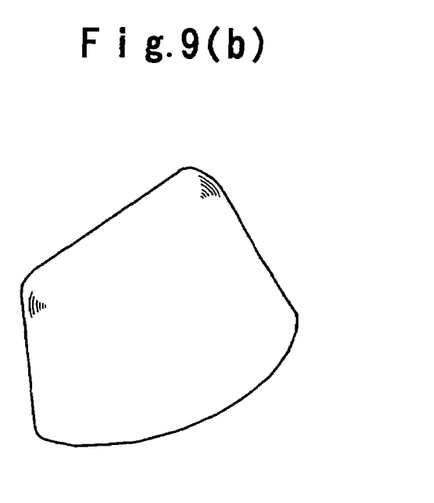

The design shown in FIG. 9(b) has a shape which apparently forms a part of the peripheral shape of a truncated cone. When a glass sheet having such a design is used in the backlite of an automobile, the glass sheet is provided so as to extend deeply into the roof and both sides of the automobile. This design also requires extremely small radii of curvature at bent portions where a flat surface connects with curved side surfaces.

As stated earlier, windows having an extremely complicated design have been recently adopted in automobiles, and it has been demanded to provide an innovative method capable of preparing windows having an extremely complicated design. In the case of a design having a shallow bent shape, it has been possible to bend a glass sheet sufficiently even at a low temperature, such as 650° C. When an attempt is made to bend a glass sheet in the complicated design shown in FIG. 9(a) or 9(b) at such a low temperature, there is caused a problem that a wrinkle is formed in a peripheral edge of the glass sheet or several kinds of optical distortions are caused in the glass sheet since the glass sheet cannot be sufficiently bent in all portions thereof.

Even if the bending temperature is set at a higher temperature than the conventional bending temperature, it is not acceptable to raise the bending temperature without taking any additional measure. This is because a new problem that a softened glass sheet is melt-bonded to a mold is caused in this case. Although the publication stated earlier discloses how to bend a glass sheet by pressing for the purpose of producing a front panel for a display unit, the publication does not disclose how to ensure both bendability and mold releasability in bending a glass sheet.

It is an object of the present invention to solve the problem stated earlier and to provide a method for bending a flat glass sheet in a complicated design without a wrinkle or an optical distortion being caused or the glass sheet being melt-bonded to a mold.

In order to attain the object of the present invention, the present invention provides a method wherein a glass sheet, which has been heated to have a viscosity of not lower than $10^5$ Pa·s and not higher than $10^8$ Pa·s, is pressed against a mold having a certain bending surface to be bent in a shape along the bending surface, characterized in that it comprises controlling a bending temperature T and a bending time period t for the glass sheet so as to satisfy the following formulas 1 and 2, and bending the glass sheet:

$$0.05 < \phi < 2.00 \qquad \text{Formula 1}$$

$$\phi = \int_0^t \frac{P(\tau)}{\eta(T)} d\tau \qquad \text{Formula 2}$$

where $P(\tau)$ is a surface pressure difference (unit: Pa) between a pressure applied on a primary surface of the glass sheet and a pressure applied on a rear surface of the glass sheet at a time $\tau$, t is a bending time period (unit: s), $\eta(T)$ is the viscosity (unit: Pa·s) of the glass sheet at a temperature T, and T is a bending temperature (unit: 0° C.) at the time $\tau$.

According to one mode of the present invention, it is preferable that the bent glass sheet includes a portion having a radius of curvature of not larger than 100 mm. It is also preferable that the bent glass sheet includes a corner where three surfaces connect together and that each of the surfaces is a flat surface or a curved surface having a radius of curvature of not smaller than 500 mm. It is also preferable that the method further comprises sandwiching a peripheral portion of the glass sheet between the mold and a ring substantially conforming to a peripheral edge of the glass sheet, the bending surface of the mold being formed in a concave shape, and sucking air between the glass sheet and the bending surface during bending the glass sheet. Additionally, it is preferable that the method further comprises trimming a portion of the glass sheet sandwiched between the ring and the mold after bending the glass sheet.

It is also preferable that the method further comprises putting the glass sheet on a ring, and pressing the glass sheet against the mold to press the glass sheet during bending the glass sheet, the mold being provided above the glass sheet. It is also preferable that the glass sheet is bent primarily only by gravity. It is also preferable that the method further comprises applying a mold-releasing agent to the mold before bending the glass sheet. It is also preferable that the method further comprises preparing the glass sheet by a float method. Additionally, it is preferable that the glass sheet is for production of an automobile window. Further, it is preferable that the method further comprises blowing air to swell the glass sheet in a first direction, followed by sucking air to bend the glass sheet in a second direction.

Additionally, the present invention provides an apparatus where a glass sheet, which has been heated to have a viscosity of not lower than $10^5$ Pa·s and not higher than $10^8$ Pa·s, is pressed against a mold having a certain bending surface to be bent in a shape along the bending surface; characterized in that the method comprises a controller for performing operational monitoring of respective members in the apparatus and operational controlling of the respective members, the controller having a program code stored therein, the program code performing a step recited above in a computer.

Now, the principle of the present invention will be explained. The inventors have found that it is necessary to satisfy two kinds of factors of bendability and mold releasability in bending a glass sheet in order to realize a complicated shape. Specifically, in order to bend a glass sheet in such a complicated shape that the glass sheet includes at least one portion having a radius of curvature of not larger than 100 mm, it is necessary to lower the viscosity of the glass sheet by heating the glass sheet to a higher temperature than the conventional bending temperature. However, when the viscosity is extremely lowered, the glass sheet is melt-bonded to a jig (such as ring, a mold or a roller) for supporting the glass sheet during bending. The inventors newly propose a bending evaluation index $\phi$ represented by formula 2, and have confirmed that it is possible to ensure sufficient bendability and excellent mold releasability by controlling a bending time period and a bending temperature so that this index stays in a range defined by formula 1.

First, how to derive the bending evaluation index $\phi$ will be referred to. Glass is a substance, which has a physical property varying according to temperature changes. The physical property of glass exhibits an elasticity ($\eta > 10^{13.5}$ (Pa·s)), a viscoelasticity ($10^{8.0} < \eta < 10^{13.5}$ (Pa·s)) and a viscosity ($\eta < 10^{8.0}$ (Pa·s)) in this sequential order from a low temperature side. These numerical ranges slightly vary according to the composition of glass.

The conventional bending technique has been carried out in a temperature range exhibiting a viscoelasticity. Specifically a glass sheet is bent by a bending force applied from outside by a device. The main mechanism is that the generation of bending stresses according to the theory of elasticity and a stress relaxation phenomenon peculiar to a viscoelastic body are concurrently progressing to finally obtain a certain shape free from the generation of springback. In the conventional bending technique, a crack can be caused when a stress generated at the time of bending exceeds a certain threshold value. Additionally, the expansion/contraction rate of a bent glass sheet with respect to the original flat glass sheet is normally not greater than 1%, though a distribution of expansion/contraction rates locally contains a larger value than 1% in a rare case.

On the other hand, the bent shape targeted by the present invention is one that needs a larger expansion/contraction rate of greater than 1%, which cannot be solved by the conventional bending technique stated earlier. In order to cope with this problem, it is necessary to lower the viscosity of a glass sheet to a lower level (not lower than $10^5$ Pa·s and not higher than $10^8$ Pa·s) than the conventional level and to bend the glass sheet by mainly utilizing the viscous flow in the present invention. Under such conditions, an elastic effect can be almost ignored, and the law of viscosity is dominant. From this viewpoint, the physical phenomenon with respect to bending can be controlled by three parameters of a viscosity, a pressure and a pressure application time period in order to make bending under the conditions.

The present invention newly proposes the bending evaluation index $\phi$, wherein the relationship among the three parameters becomes dimensionless. By making bending so that this index stays in a certain numerical range, the present invention can solve various kinds of problems, which have been caused at the time of performing the conventional bending operation. In accordance with the invention, even if bending conditions are different in terms of the respective parameters, the same bent shape can expect to be obtained as long as the index $\phi$ is the same value. As a result, it is possible to appropriately set the bending conditions.

Figure 1A:
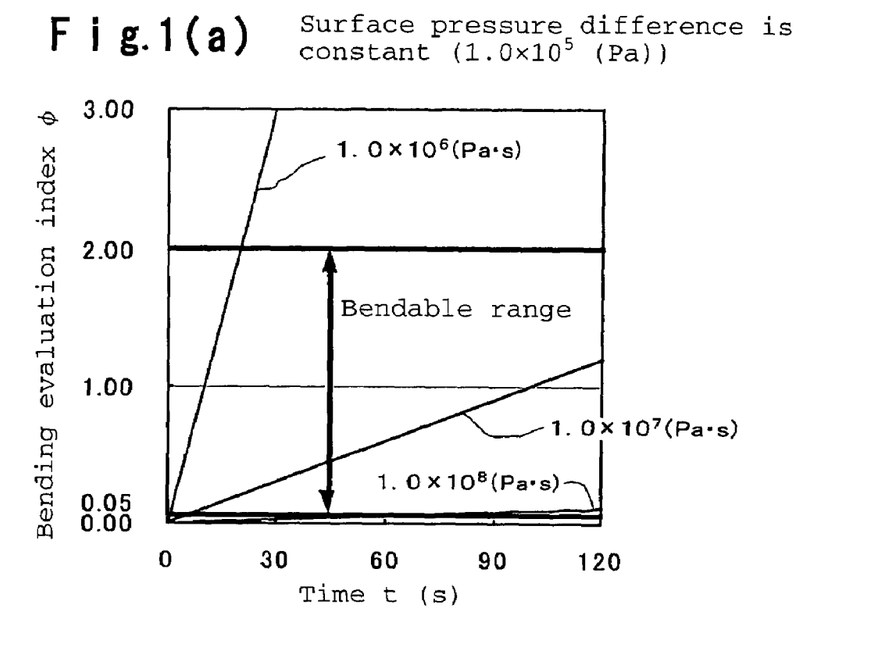
FIGS. 1(a) and 1(b) are a graph showing the relationship between the bending evaluation index and a bending time period when a surface pressure difference is constant, and a graph showing the relationship between the bending evaluation index and a bending time period when viscosity is constant, respectively.
Figure 1B:
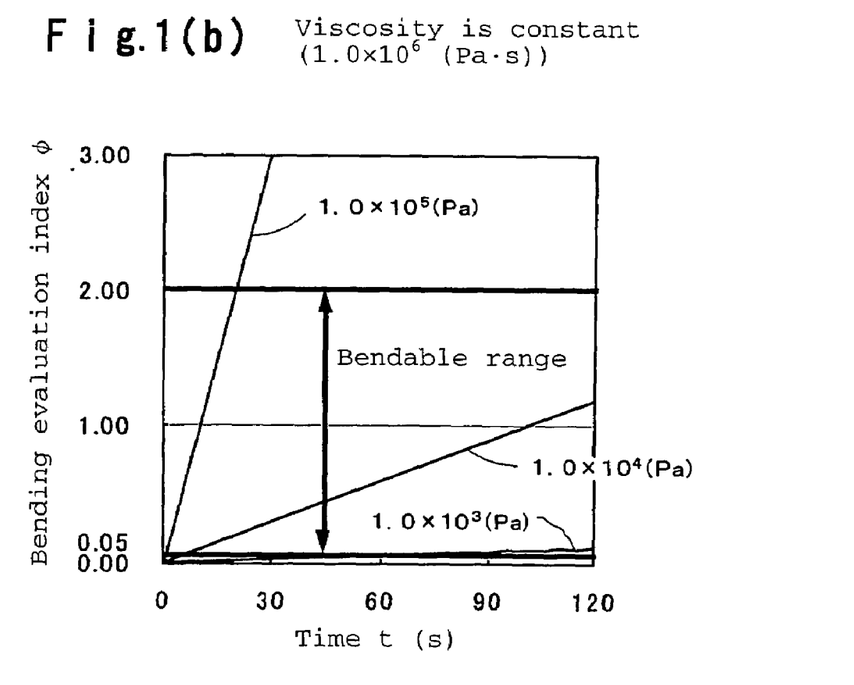

FIGS. 1(a) and 1(b) are graphs showing the relationship between the bending evaluation index and a time period for holding a surface pressure to a glass sheet. From these figures, it is revealed that the value of the bending evaluation index $\phi$ increases with the lapse of time. The index $\phi$ is a dimensionless number, and the range defined by formula 1 is a bendable range. The figures show a case wherein a surface pressure difference is constant and a case wherein viscosity is constant. Even if any one of the parameters is a variable, the essence of the principle does not change as long as the calculated value of formula 2 satisfies formula 1.

The sufficient bendability means that at the time of bending, a glass sheet can be brought into contact with the entire region of the bending surface of the mold that substantially corresponds to the certain shape. The excellent mold releasability means that a glass sheet subjected to bending can be released from the mold without a surface of the glass sheet being melt-bonded to the mold. When both states of the sufficient bendability and the excellent mold releasability are compatible, the conditions for bendability are defined as being met. In other words, when the bending evaluation index $\phi$ is not larger than 0.05, there is a possibility that a part of the region of the bending surface of the mold that substantially corresponds to the certain shape does not come into contact with a glass sheet. On the other hand, when the bending evaluation index $\phi$ is not smaller than 2.00, there is a possibility that a glass sheet subjected to bending cannot be released from the mold since the glass sheet has been melt-bonded to the mold. In a case wherein holes for, e.g., vacuum suction are provided, the areas with the holes are eliminated in determining whether proper contact is established or not.

With respect to the surface pressure difference P, it does not always mean a pressure in the strict sense. It may mean a pressure, which can be obtained by converting an applied load, such as weight, into an equivalent surface pressure. In other words, in a case of making bending in combination with pressing, a pressure value equivalent to the load applied by pressing is added as a component of the surface pressure difference P with respect to a portion of a glass sheet with the pressing load applied thereto. When the surface pressure difference P or the viscosity varies from portion to portion, it is easily imagined that the value of the bending evaluation index $\phi$ also varies from portion to portion. In such a case, whether the conditions are met or not is determined, the bending evaluation index $\phi$ being set at the highest value in the range wherein a glass sheet can take substantially the certain shape.

As stated earlier, the bending method according to the present invention is significantly different from the conventional bending method in terms of the concept of bending. If the conventional bending method is forcibly evaluated by the bending evaluation index $\phi$ for comparison, the conventional bending method is evaluated as shown in formula 3, which reveals that the bending evaluation index for the conventional bending method is extremely out of the numerical range represented by formula 1.

$$1.00 \times 10^{-6} < \phi < 2.00 \times 10^{-4} \qquad \text{Formula 3}$$

Now, an embodiment of the present invention will be described, referring to the accompanying drawings.

Figure 2:
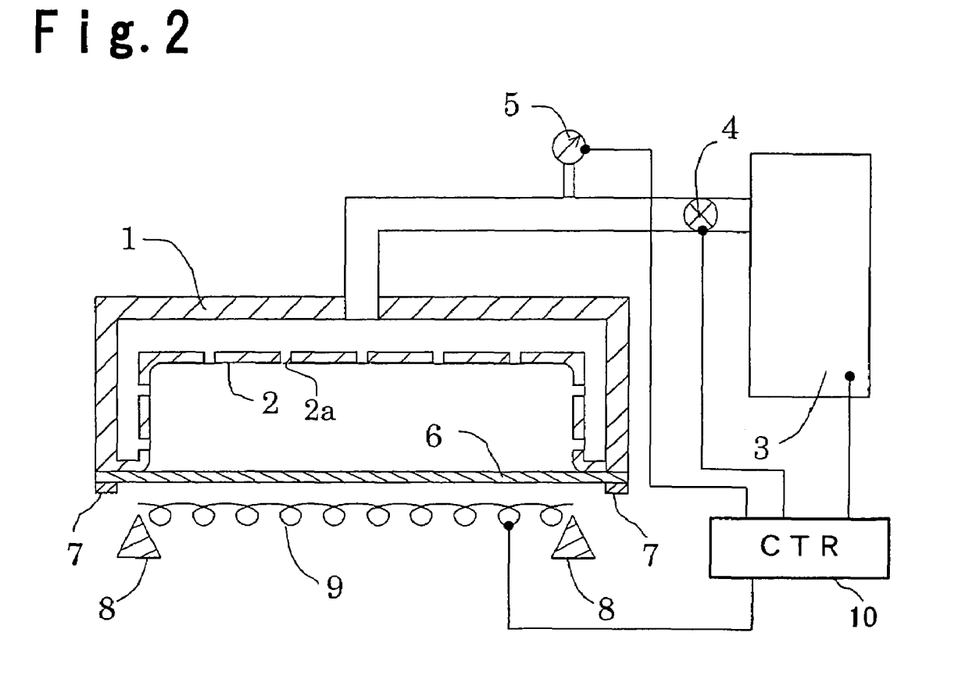
FIG. 2 is a schematic view showing a bending apparatus adapted to an embodiment for carrying out the bending method according to the present invention.

FIG. 2 shows a bending apparatus adapted to the embodiment for carrying out the bending method according to the present invention. As shown in this figure, the bending apparatus includes a metallic casing 1, a mold 2, which has a bending surface for contact with a glass sheet 6 and a plurality of holes 2a formed in the bending surface for vacuum suction, a glass plate holding unit 7 for holding the glass plate 6 at its peripheral edge, a vacuum device 3, a pressure control valve 4 provided in a pipe connecting the casing 1 and the vacuum device 3, and a pressure gauge 5. The mold 2 may be formed in a convex or concave shape. The operational monitoring and the operational control of the respective members (such as the vacuum device 3, the pressure control valve 4, the pressure gauge 5 and a heater 9) of the bending apparatus are performed by a controller 10 comprising, e.g., a computer, so that the evaluation index $\phi$ for bending operation stated earlier satisfies a specified value.

Now, a bending process using the apparatus shown in FIG. 2 will be described. First, the glass sheet 6, which has been sufficiently heated and softened (to have a viscosity of not lower than $10^5$ Pa·s and not higher than $10^8$ Pa·s), is sandwiched between the glass sheet holding unit 7 formed in a ring shape and an edge of the casing 1 to be fixed to the mold 2. The glass sheet 6 may be heated and softened by the heater 9 comprising, e.g., an electric heater or a gas burner, after having been fixed to the mold 2.

After that, while the suction force of the vacuum device 3 is adjusted by controlling the opening and closing of the pressure control valve 4, the glass sheet is sucked to be brought in contact with the bending surface of the mold 2 to be bent under such conditions that the evaluation index $\phi$ for bending stays in a certain range. The vacuum pressure, the bending temperature and the bending time period are controlled to satisfy formula 1 and 2. In order to shorten the bending time period, it is preferable that the surface pressure difference is large.

By using the process stated earlier, it is possible to bend the glass sheet in a complicated shape as shown in FIG. 9(a) or 9(b). In particular, the present invention is effective to bend a glass sheet in a shape having a radius of curvature of not larger than 100 mm. The present invention can easily bend a glass sheet to have a corner where three or more surfaces connect together (e.g., a corner 100 in FIG. 9(a)). In this case, each of the surfaces is a flat surface or a curved surface having a radius of curvature of not smaller than 500 mm. The bent portion where two surfaces connect each other has a radius of curvature of not larger than 100 mm, and the smallest radius of curvature is not larger than 50 mm (preferably not larger than 30 mm, more preferably not larger than 10 mm).

Instead of the vacuum device 3, a unit for applying a high pressure to the side of the glass sheet 6 remote from the mold 2, or a unit for rotating the bending apparatus to generate a centrifugal force so as to bring the glass sheet 6 in contact with the mold 2 may be used. The radius of curvature at the bent portions and the like is measured on an interior side of a glass sheet, i.e., on a concave side of a curved glass sheet.

EXAMPLE 1

Now, an example of the present invention will be described. The inventors used rectangular glass sheets having a thickness of about 4.0 mm and about 2.8 mm. By the bending apparatus shown in FIG. 2, the inventors bent the glass sheets in such a shape that the ratio of the height of the inner surface to a short side is 0.357 and the radius of curvature at each of the bent portions is about 10 mm in each of the glass sheets. The glass sheets had glass viscosities of $\eta=10^{6.3}$ Pa·s, $\eta=10^{6.5}$ Pa·s and $\eta=10^{6.5}$ Pa·s at the start of bending, and the glass sheets had glass viscosities of $10^{7.4}$ Pa·s, $10^{7.5}$ Pa·s and $10^{7.2}$ Pa·s at completion of bending since the glass sheets were subjected to temperature changes during bending.

Figure 3:
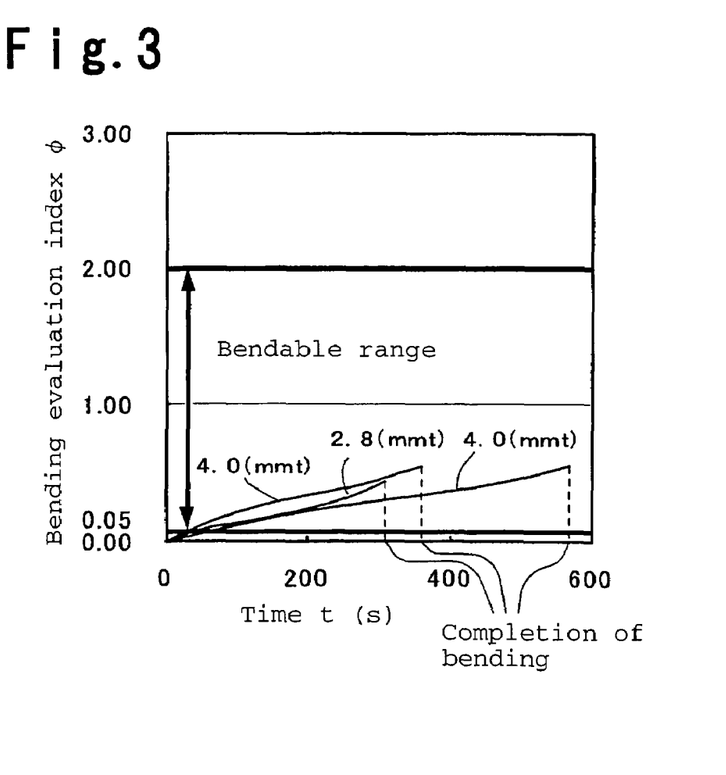
FIG. 3 is a graph showing the relationship between the bending evaluation index and a bending time period in Example 1.

The vacuum pressures applied to the glass sheets changed with the lapse of time, and the measurement results for the vacuum pressures are shown in FIG. 3, being applied to the bending evaluation $\phi$, which is represented by formula 2. This figure clearly shows that formula 1 was satisfied on completion of bending.

EXAMPLE 2

Now, another example of the present invention will be described.

Figures 4A, 4B:
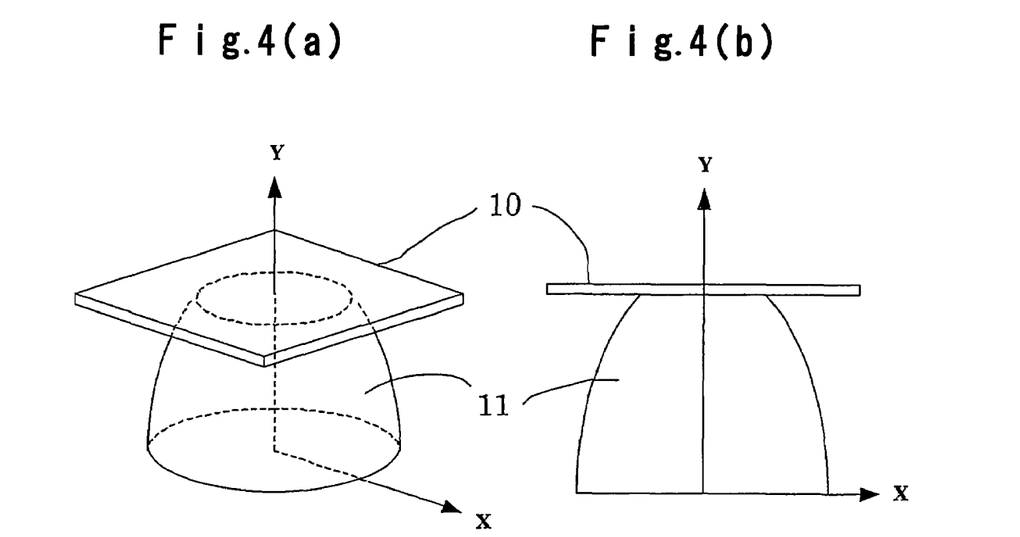
FIGS. 4(a) and 4(b) are a perspective view and a side view showing Example 2.

FIG. 4 shows an example wherein one of rectangular glass sheets was put on a mold comprising a curved surface and a flat surface and was bent by gravity. The curved surface of the mold 11 had a radius of curvature of about 60 mm on an XY section in this figure. At the start of bending, the upper flat surface of the mold with a glass sheet 10 put thereon had a radius of about 12 mm, the bottom of the mold had a radius of about 24 mm, and the distance from the bottom to the upper flat surface was about 36 mm.

Figure 5:
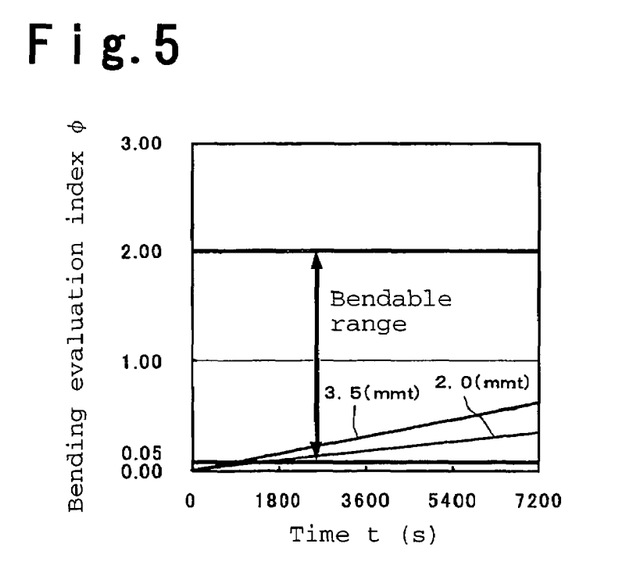
FIG. 5 is a graph showing the relationship between the bending evaluation index and a bending time period in Example 2.

A bent portion of the mold, through which the upper flat surface merged into the curved surface, had a radius of curvature of as extremely small as about 1 mm. The number of the glass sheets 10 used in this Example was two, one of the glass sheets had a thickness of about 3.5 mm and the other had a thickness of about 2.0 mm. Both glass sheets had a rectangular shape having dimensions of about 60 mm×about 60 mm when the sheets were flat. The glass sheets were bent in a certain shape without being melt-bonded to the mold in 7,200 s as the bending time period, under such conditions that the glass sheets maintained a glass viscosity of $\eta=10^{6.0}$ (Pa·s) during bending and that no other pressure than gravity was applied. The measurement results are shown in FIG. 5, being applied to the bending evaluation index $\phi$ represented in formula 2. It was found that the conditions for completion of bending satisfies formula 1. It was verified that the bending evaluation index $\phi$ is applicable even in the case of bending a glass sheet by gravity.

EXAMPLE 3

Figures 6A, 6B:
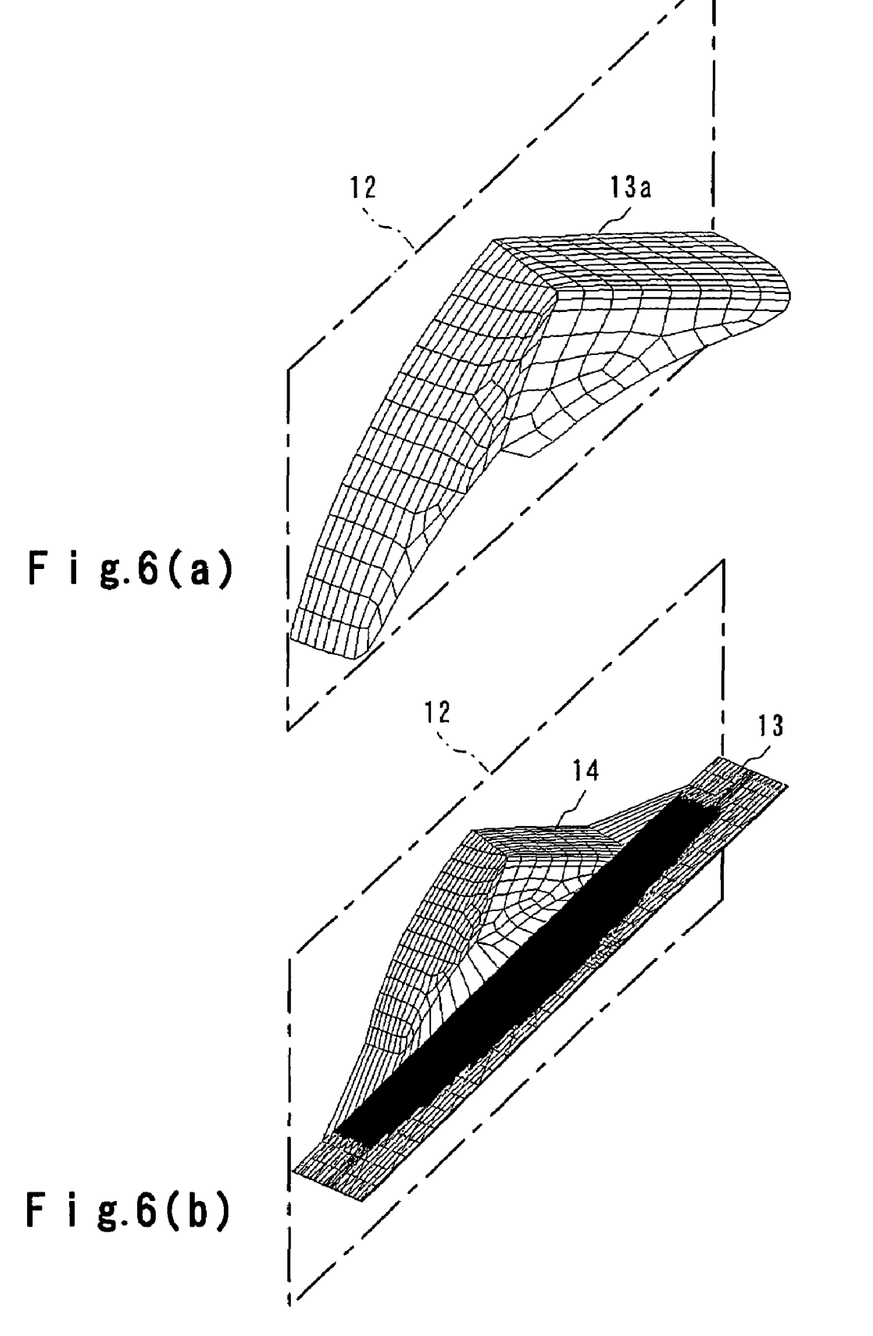
FIGS. 6(a) and 6(b) are a perspective view showing a glass sheet after bending and a perspective view showing a mold and the glass sheet before bending in Example 3.

As shown in FIG. 6(a), a glass sheet is designed to have a typical bent shape wherein three curved surfaces having a radius of curvature of not smaller than 500 mm connect together through bent portions having a radius of curvature of not larger than 100 mm at two locations. In this figure, only a half part 13a of the glass sheet after bending is shown, and the glass sheet is symmetrical with respect to a plane 12 as an imaginary symmetrical plane.

In order to examine the bendability with respect to this shape, an imaginary mold 14 having a concave shape shown in FIG. 6(b) was made up, and simulation for bending was performed by a computer. The simulation was performed for the ½ model with the symmetric shape being considered. The simulation was performed under such conditions that the glass sheet 13 had a rectangular shape having initial dimensions of 1450 mm×800 mm as viewed in a plan view and a thickness of 5.0 mm. In the simulation, the glass sheet 13 maintained a glass viscosity of $\eta=10^{6.0}$ (Pa·s), and a constant vacuum pressure of $-1.013\times10^5$ (Pa) (i.e., a surface pressure difference P of $1.013\times10^5$ (Pa/s)) was constantly applied perpendicular to the surface of the glass sheet on a region without contact with the mold 14 (a black region in each of these figures).

Figure 7A:
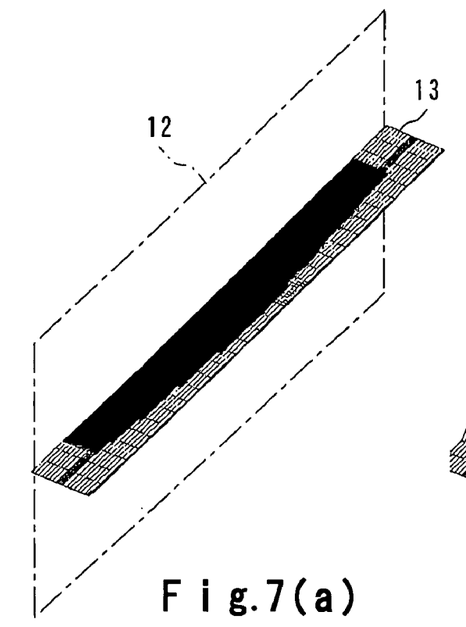
FIGS. 7(a) to 7(d) are perspective views showing how to bend a flat glass sheet in Example 3.
Figure 7B:
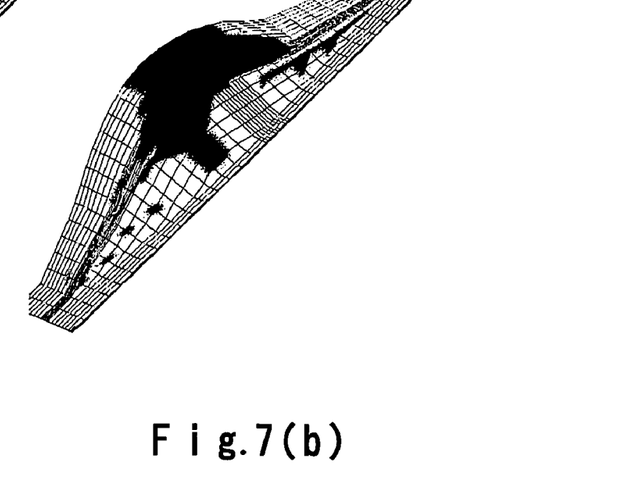
Figure 7C:
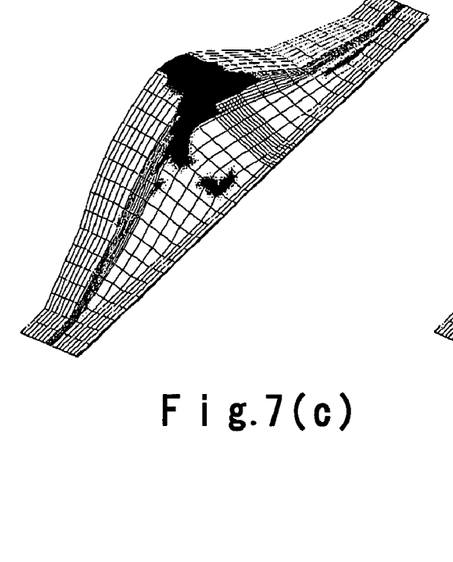
Figure 7D:
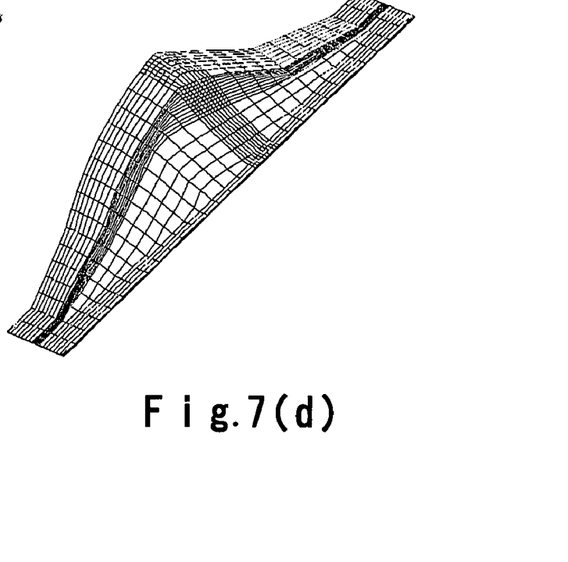

FIG. 7(a) to 7(d) show the measurement results only for the glass sheet, FIG. 7(a) showing initial conditions, FIG. 7(b) showing the conditions after 0.05 s passed since the start of bending, FIG. 7(c) showing the conditions after 0.10 s passed since the start of bending, and FIG. 7(d) showing the conditions after 0.60 s passed since the start of bending. As clearly shown in these figures, it is revealed that the region of the glass sheet 13 without contact with the mold 14 (the black region in each of these figures) decreased as the bending operation was progressing, and that the glass sheet 13 had been completely brought in contact with the entire inner surface of the mold 14 at the time when 0.60 s passed since the start of bending.

Figure 8:
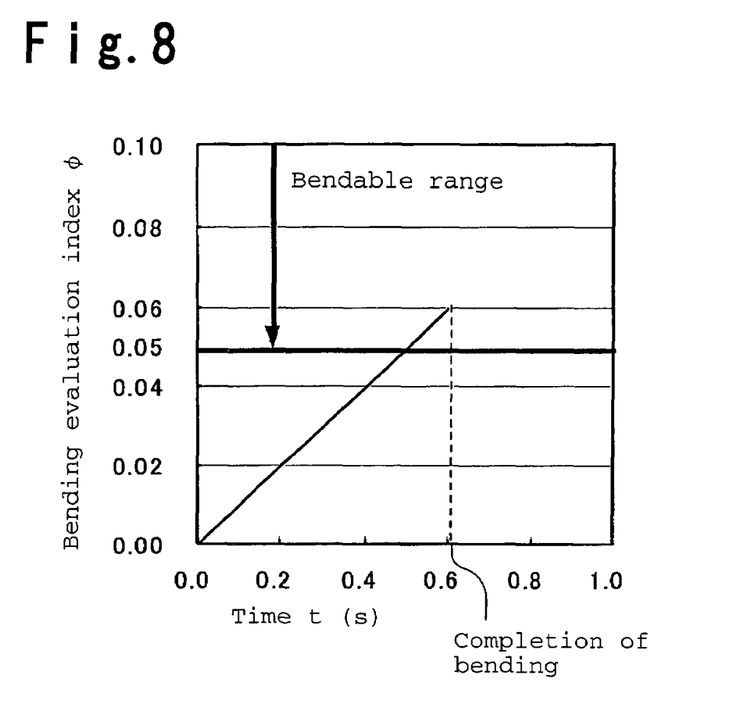
FIG. 8 is a graph showing the relationship between the bending evaluation index and a bending time period in Example 3.

FIG. 8 shows the measurement results in this example, being applied to the bending evaluation index $\phi$ represented by formula 2. This figure reveals that the conditions for completion of bending also satisfy formula 1. Since the peripheral portion of a glass sheet, which is sandwiched between the glass sheet holding unit 7 and the casing 1 as in this example, is subjected to a large degree of deformation, it is preferable that the peripheral portion is trimmed by a trimming unit 8 comprising, e.g., a metallic or ceramic cutter after bending.

As explained earlier, the present invention can bend a glass sheet in a complicated shape without melt-bonding the glass sheet softened to a jig, since the bending time period and the bending temperature are controlled so that the bending evaluation index for bending $\phi$ stays in the certain range. Additionally, with respect to a glass surface without contact with a mold, the quality (smoothness) obtained by, e.g., a float method can be taken advantage of without being degraded, since bending can be performed with at least a single side of a glass sheet being brought in contact with the mold.

It is clear that the method for bending a glass sheet according to the present invention is applicable not only to the apparatus shown in FIG. 2 but also various kinds of existing bending apparatuses. For example, the method according to the present invention is applicable to an apparatus to put a heated glass sheet on a ring or a curved roller to be bent by gravity (e.g., U.S. Pat. No. 6,240,746), an apparatus to press a heated glass sheet between a ring and a mold (e.g., US2002/0166344A1), an apparatus to bend a glass sheet by independently and vertically moving rollers forming a roller conveyer to change a glass sheet conveying surface as in a propagating wave (e.g., U.S. Pat. No. 6,397,634), and an apparatus to bend a glass sheet by gravity while the glass sheet is floated by injecting heated air from a curved furnace floor (e.g., U.S. Pat. No. 6,014,873). In these cases, a bending jig, such as a ring or a mold, may have a surface for contact with a glass sheet coated with a mold-releasing agent or covered with woven cloth or unwoven cloth made of, e.g., PBO (polyparaphenylene benzobisoxazol) and having a heat-resisting property.

The entire disclosure of Japanese Patent Application No. 2002-299423 filed on Oct. 11, 2002 including specification, claims, drawings and summary is incorporated herein by reference in its entirety.

What is claimed is:

1. A method of bending a glass sheet which has been heated to have a viscosity of not lower than $10^5$ Pa·s and not higher than $10^8$ Pa·s, comprising the steps of:

bending the glass sheet by pressing portions of the heated glass sheet having a viscosity of not lower than $10^5$ Pa·s and not higher than $10^8$ Pa·s against a bending surface, wherein the portions of the heated glass sheet having a viscosity of not lower than $10^5$ Pa·s and not higher than $10^8$ Pa·s are pressed against the bending surface in the bending step; and controlling a bending temperature T and a bending time period t for the glass sheet so as to satisfy the following formulas 1 and 2:

$$0.05 < \phi < 2.00 \quad \text{Formula 1}$$

$$\phi = \int_0^t \frac{P(\tau)}{\eta(T)} d\tau \quad \text{Formula 2}$$

where $P(\tau)$ is a surface pressure difference (unit: Pa) between a pressure applied on a primary surface of the glass sheet and a pressure applied on a rear surface of the glass sheet at a time $\tau$, t is a bending time period (unit: s), $\eta(T)$ is the viscosity (unit: Pa·s) of the glass sheet at a temperature T, and T is a bending temperature (unit: °C.) at a time $\tau$.

2. The method according to claim 1, wherein the bent glass sheet includes a portion having a radius of curvature of not larger than 100 mm.

3. The method according to claim 2, wherein the bent glass sheet includes a corner where three surfaces connect together, and each of the surfaces is a flat surface or a curved surface having a radius of curvature of not smaller than 500 mm.

4. The method according to claim 1, further comprising sandwiching a peripheral portion of the glass sheet between a mold and a ring substantially conforming to a peripheral edge of the glass sheet, the bending surface of the mold being formed in a concave shape; and sucking air between the glass sheet and the bending surface during bending the glass sheet.

5. The method according to claim 4, further comprising trimming a portion of the glass sheet sandwiched between the ring and the mold after bending the glass sheet.

6. The method according to claim 1, further comprising putting the glass sheet on a ring, and pressing the glass sheet against the mold to press the glass sheet during bending the glass sheet, the mold being provided above the glass sheet.

7. The method according to claim 1, wherein the glass sheet is bent primarily only by gravity.

8. The method according to claim 1, further comprising applying a mold-releasing agent to the mold before bending the glass sheet.

9. The method according to claim 1, further comprising preparing the glass sheet by a float method.

10. The method according to claim 1, further comprising blowing air to swell the glass sheet in a first direction, followed by sucking air to bend the glass sheet in a second direction.

11. A method of bending a glass sheet, the entirety of which has been heated to have a viscosity of not lower than $10^5$ Pa·s and not higher than $10^8$ Pa·s, comprising the steps of:
   bending the glass sheet by pressing the heated glass sheet having a viscosity of not lower than $10^5$ Pa·s and not higher than $10^8$ Pa·s against the bending surface; and
   controlling a bending temperature T and a bending time period t for the glass sheet so as to satisfy the following formulas 1 and 2:

$$0.05 < \phi < 2.00 \quad \text{Formula 1}$$

$$\phi = \int_0^t \frac{P(\tau)}{\eta(T)} d\tau \quad \text{Formula 2}$$

where $P(\tau)$ is a surface pressure difference (unit: Pa) between a pressure applied on a primary surface of the glass sheet and a pressure applied on a rear surface of the glass sheet at a time $\tau$, t is a bending time period (unit: s), $\eta(T)$ is the viscosity (unit: Pa·s) of the glass sheet at a temperature T, and T is a bending temperature (unit: ° C.) at the time $\tau$.

12. The method according to claim 1, wherein said bending step comprises bringing the glass sheet into contact with the entirety of the surface of a mold.

* * * * *

UNITED STATES PATENT AND TRADEMARK OFFICE
CERTIFICATE OF CORRECTION

PATENT NO.        : 7,401,477 B2
APPLICATION NO. : 10/674354
DATED             : July 22, 2008
INVENTOR(S)      : Inoue et al.

Page 1 of 1

It is certified that error appears in the above-identified patent and that said Letters Patent is hereby corrected as shown below:

On the title page, Item (73), the Assignee should read:

-- Asahi Glass Company, Limited, Tokyo (JP) --

Signed and Sealed this

Twenty-third Day of September, 2008

JON W. DUDAS
*Director of the United States Patent and Trademark Office*